US010403958B2

(12) United States Patent
Hanna et al.

(10) Patent No.: US 10,403,958 B2
(45) Date of Patent: Sep. 3, 2019

(54) METHOD FOR MAKING A COMPOSITE SUBSTRATE CIRCULATOR COMPONENT

(71) Applicant: Raytheon Company, Waltham, MA (US)

(72) Inventors: Mark B. Hanna, Allen, TX (US); Sankerlingam Rajendran, Plano, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/384,200

(22) Filed: Dec. 19, 2016

(65) Prior Publication Data

US 2018/0175473 A1   Jun. 21, 2018

(51) Int. Cl.
| | |
|---|---|
| *H01P 11/00* | (2006.01) |
| *H01P 1/39* | (2006.01) |
| *H01R 43/20* | (2006.01) |
| *H01P 1/38* | (2006.01) |
| *H01P 1/387* | (2006.01) |
| *G01S 7/02* | (2006.01) |

(52) U.S. Cl.
CPC .............. *H01P 11/005* (2013.01); *H01P 1/38* (2013.01); *H01P 1/387* (2013.01); *H01P 1/39* (2013.01); *H01P 11/00* (2013.01); *H01P 11/001* (2013.01); *H01P 11/006* (2013.01); *H01R 43/20* (2013.01); *G01S 7/02* (2013.01); *Y10T 29/49789* (2015.01); *Y10T 29/49798* (2015.01)

(58) Field of Classification Search
CPC ........ H01P 1/38; H01P 11/005; H01P 11/006; H01P 11/001; H01P 1/387; H01P 1/39; H01P 11/00; G01S 7/02; H01R 43/20; Y10T 29/49789; Y10T 29/49798
See application file for complete search history.

(56) References Cited

U.S. PATENT DOCUMENTS

| | | | |
|---|---|---|---|
| 3,457,525 A | 7/1969 | Hines et al. | |
| 3,849,878 A * | 11/1974 | Rudd | Y10T 29/49798 29/412 |
| 4,800,389 A * | 1/1989 | Reger | G01S 7/02 342/158 |
| 5,475,921 A * | 12/1995 | Johnston | H01R 43/20 29/878 |
| 6,611,180 B1 | 8/2003 | Puzella et al. | |

(Continued)

FOREIGN PATENT DOCUMENTS

JP    2016119596 A  *  6/2016

OTHER PUBLICATIONS

Machine Translation of Japanese Patent Publication JP 2016-119596, dated Jan 2019. (Year: 2019).*

(Continued)

*Primary Examiner* — A. Dexter Tugbang

(57) ABSTRACT

A method for making a composite substrate circulator comprising disposing a plurality of sleeves about a plurality of rods, disposing the plurality of rods and the plurality of sleeves in a plurality of openings in a block to form an assembly, and dividing the assembly to form a plurality of plates. Each plate includes a portion of the plurality of sleeves and the plurality of rods. The magnetic saturation (4PiMs) values of the rods and sleeves are chosen to decrease radially (rod has the highest 4PiMs).

13 Claims, 5 Drawing Sheets

(56) References Cited

U.S. PATENT DOCUMENTS

| | | |
|---|---|---|
| 9,136,572 B2 | 9/2015 | Carr et al. |
| 2006/0139118 A1 | 6/2006 | Vaughn et al. |
| 2012/0280760 A1 | 11/2012 | Cruickshank et al. |

OTHER PUBLICATIONS

Blight et al., A Compact Broadband Microstrip Circulator for Phased Array Antenna Modules, IEEE MTT-S International, Jun. 1-5, 1992, 4 pages, IEEE, Albuquerque, NM.

Krowne et al., Theory and Numerical Calculations for Radially Inhomogeneous Circular Ferrite Circulators, IEEE Transactions on Microwave Theory and Techniques, Mar. 1996, pp. 419-431, vol. 44, Issue 3, IEEE, USA.

* cited by examiner

METHOD FOR MAKING A COMPOSITE SUBSTRATE CIRCULATOR COMPONENT

BACKGROUND

A typical circulator is a passive radio-frequency (RF) or optical device with three or four ports where RF power entering one port is routed to the next port in a given rotation direction. A port is a location where an external waveguide or transmission line (e.g., a microstrip line or a coaxial cable) connects to the circulator device. A monolithic ferrite substrate can be used in a circulator with narrow bandwidth capacity. To achieve broadband capabilities, a composite substrate is typically used that includes ferrite materials with different magnetic properties.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
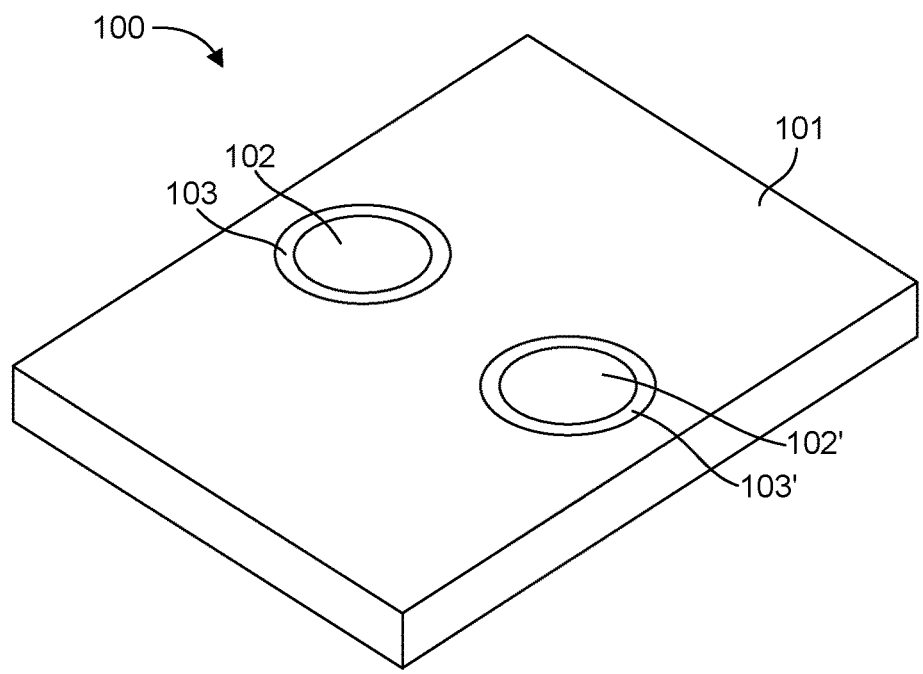
FIG. 1 is an illustration of a composite substrate circulator component in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

A composite ferrite substrate in a wideband circulator typically has a disk surrounded by an outer ring, with the disk and ring having different magnetic properties. For example, the disk may have a high saturation magnetization (4 PiMs) material and the ring may have a lower 4 PiMs material, which extends the bandwidth compared to a monolithic ferrite substrate used in narrow band circulators. These ferrite structures are often embedded inside a matrix material, such as a low loss dielectric material (e.g., magnesium titanate or nonmagnetic ferrite). The complexity of composite ferrite substrates is one of several factors that make wideband circulators more difficult to produce than narrow band circulators, and therefore more expensive.

Accordingly, a method for making a composite substrate circulator component is disclosed that facilitates simultaneous manufacture of multiple composite substrates, which can improve yield and reduce costs. In one aspect, the method can produce individual composite substrates with arrayed ferrite structures (e.g., arrayed disk and a ring structures) to accommodate a variety of composite substrate designs. In another aspect, the method can facilitate finish work processes (e.g., gap sealing of the composite substrate structures) in producing a final circulator component that is ready for assembly in a circulator. The method can include disposing a plurality of sleeves about a plurality of rods, disposing the plurality of rods and the plurality of sleeves in a plurality of openings in a block to form an assembly, and dividing the assembly to form a plurality of plates. Each plate can have a portion of the plurality of sleeves and the plurality of rods.

In one aspect, a composite substrate circulator component precursor is disclosed that can include a block having a plurality of openings, a plurality of rods disposed in the plurality of openings, and a plurality of sleeves disposed about the plurality of rods in the plurality of openings.

In another aspect, a method for making a composite substrate circulator component is disclosed that can include disposing a sleeve about a rod, and disposing the rod and the sleeve in an opening in a block to form an assembly. The rod and/or the sleeve can have a plurality of longitudinally spaced recesses. Additionally, the method can include dividing the assembly at the longitudinally spaced recesses to form a plurality of plates. Each plate can have a portion of the sleeve and the rod.

In one aspect, a composite substrate circulator component precursor is disclosed that can include a block having an opening, a rod disposed in the opening, and a sleeve disposed about the rod in the opening. The rod and/or the sleeve can have a plurality of longitudinally spaced recesses.

One embodiment of a composite substrate circulator component 100 is illustrated in FIG. 1. Circulators can have many different configurations and can utilize a variety of materials to accomplish design objectives. The composite substrate circulator component 100 illustrates one type of substrate component that can be used in a circulator. In this case, the substrate component 100 can comprise a disk 102 surrounded by a ring 103. The disk 102 and the ring 103 can be made of any suitable material, such as ferrite, garnet (e.g., yttrium iron garnet), spinel, hexaferrite, etc. For example, the disk 102 and/or the ring 103 can be made of ferrite materials having different magnetic properties. In some circulator designs, the ferrite ring 103 disposed about the ferrite disk 102 has a lower saturation magnetization value (4 PiMs) than that of the ferrite disk 102. In this case, the combined ferrite disk 102 and the lower 4 PiMs ferrite ring 103 can yield a magnetizable structure having a reduced 4 PiMs at the edge portion, which can be used to improve power and extend the bandwidth of a circulator device compared to a monolithic ferrite substrate used in narrow band circulators. The disk 102 and the ring 103 can therefore be configured to radially vary a property (i.e., from the center to the edge) for use in a circulator, such as a magnetic property (e.g., saturation magnetization) for an RF signal circulator. The disk 102 and the ring 103 can be surrounded by any suitable matrix 101. In one aspect, the matrix 101 can be any suitable dielectric material, such as a low loss dielectric (e.g., including magnesium titanate and/or non-magnetic ferrite). The disk 102, the ring 103, and the matrix 101 can be formed from separate pieces, thus making a composite substrate structure.

Figure 2:
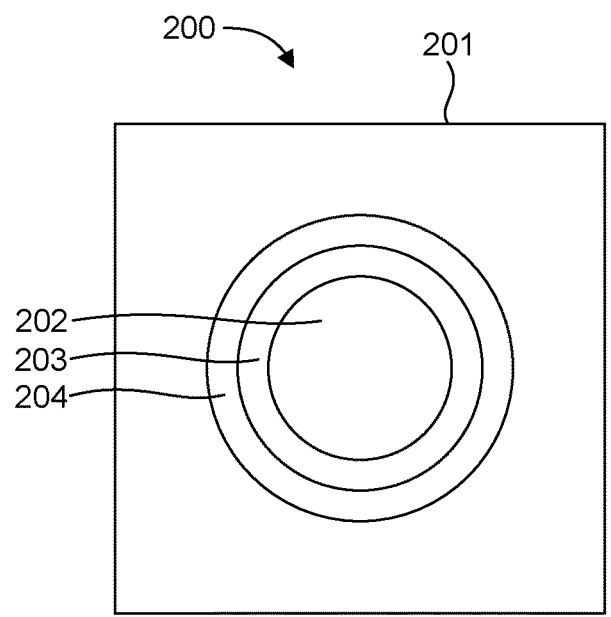
FIG. 2 is a top view of a composite substrate circulator component in accordance with another example of the present disclosure.

In one aspect, any number of rings can be disposed about a disk and can have any suitable material property for a given circulator design. For example, as shown in FIG. 2, two rings 203, 204 can be disposed about a disk 202 within a matrix 201 of a composite substrate circulator component 200. In this case, the ring 203 surrounds and is adjacent to the disk 202, and the ring 204 surrounds and is adjacent to the ring 203. The matrix 201 surrounds and is adjacent to the ring 204. Multiple rings can be utilized to radially vary material properties (e.g., magnetic properties, dielectric properties, optical properties, etc.). For example, the disk 202 and the rings 203, 204 can radially vary a magnetic property (e.g., 4 PiMs values) and the matrix 201 can be made of a dielectric material. Here, the disc 202 has the highest magnetic saturation value and the ring 204 has the lowest magnetic saturation value. Thus, the magnetic saturation value can progressively decrease in the radial direction.

In one aspect, multiple disk and ring structure combinations (e.g., the disk 102/ring 103 and disk 102'/103' of FIG. 1) can be included to form an arrayed composite substrate. Thus, a composite substrate circulator component can include only a single (i.e., one) disk and ring structure combination (as illustrated in FIG. 2) or multiple disk and ring structure combinations (as illustrated in FIG. 1) as desired for a given circulator design.

Figure 3:
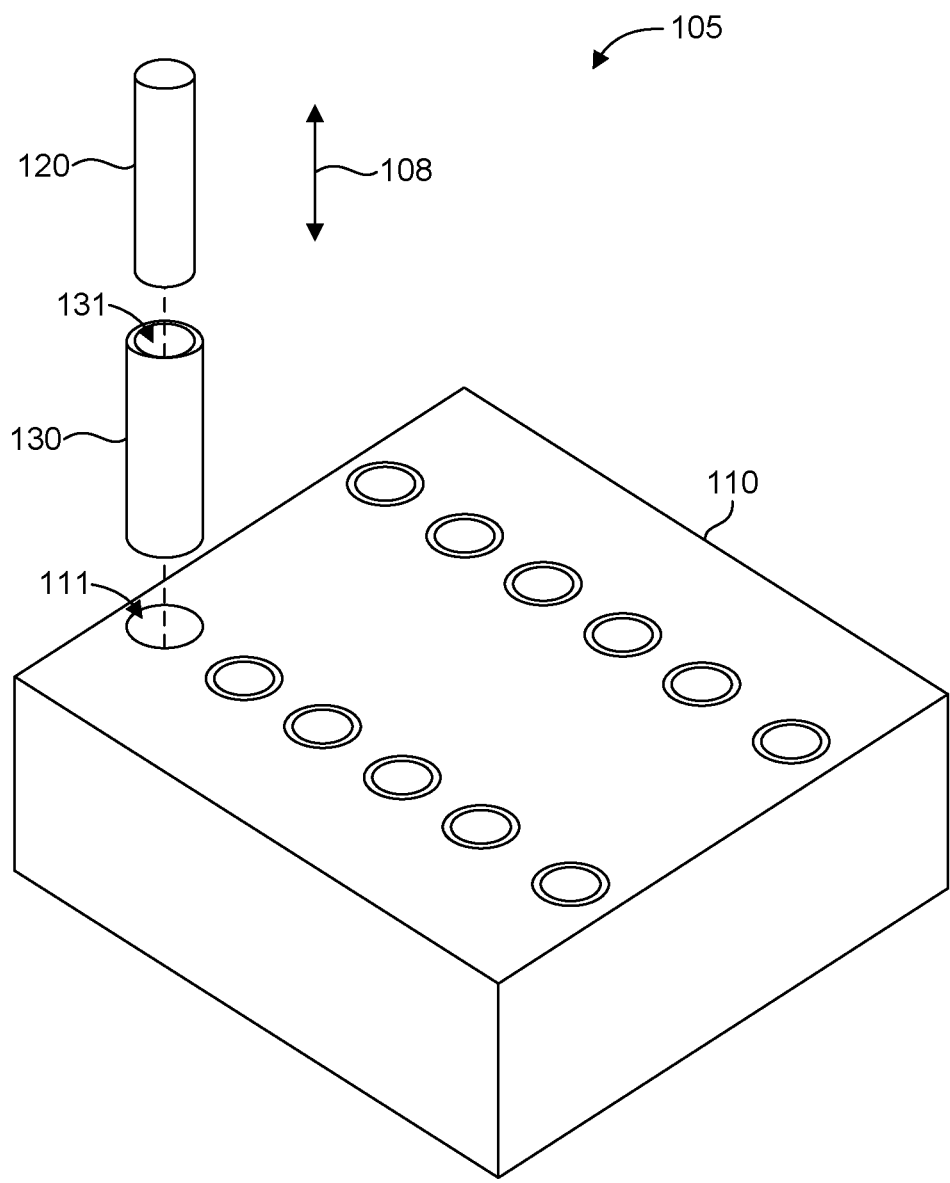
FIG. 3 is an illustration of a composite substrate circulator component precursor in accordance with an example of the present disclosure.
Figure 4:
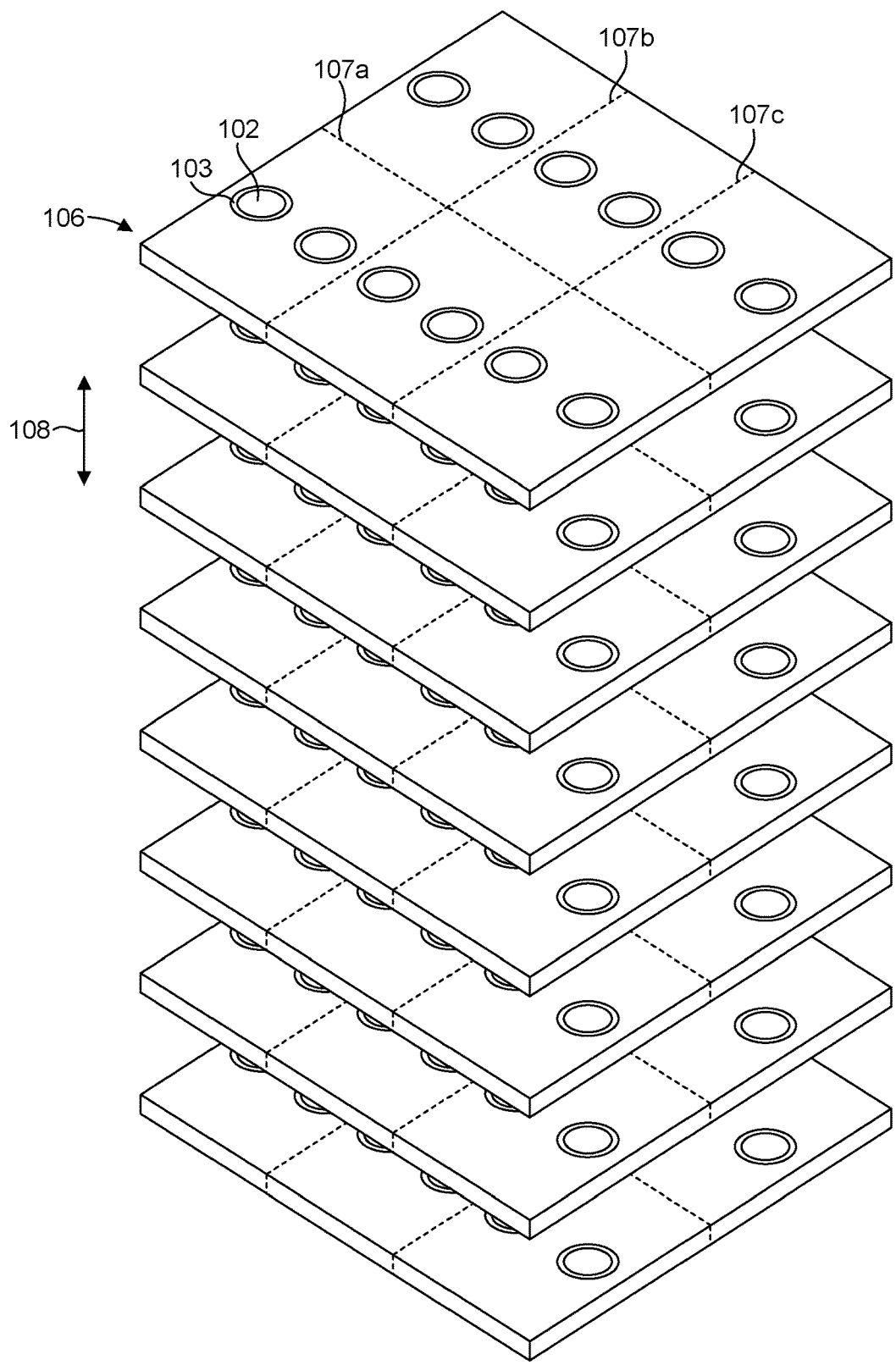
FIG. 4 illustrates dividing the composite substrate circulator component precursor of FIG. 3 in accordance with an example of the present disclosure.

FIGS. 3 and 4 illustrate aspects of a method for making a composite substrate circulator component. Although FIGS. 3 and 4 illustrate specific aspects for making the composite substrate circulator component 100 of FIG. 1, it should be recognized that the principles disclosed herein can be applied to make the composite substrate circulator component 200 of FIG. 2.

In particular, FIG. 3 shows a block 110 with openings or holes 111. The block 110 can be made of any suitable matrix material for the composite substrate 100, such as a dielectric material or a material with optical properties. The block 110 can be formed by isostatically compressing dielectric material to provide uniform electrical properties throughout the block 110. The block 110 can have any suitable shape or configuration, such as a cuboid configuration. The block 110 can be of any suitable size or dimension. In one aspect, the block 110 can have dimensions of 4"×4"×1" or larger. The openings or holes 111 can be formed by any suitable technique or process, such as drilling or boring.

Multiple rods 120 and multiple sleeves 130 can be disposed in the openings 111, with the sleeves 130 disposed about or surrounding the rods 120. This structure can form an assembly or composite substrate circulator component precursor 105. The rod 120 and the sleeve 130 can be made of any suitable material (e.g., a material with magnetic properties, optical properties, etc.) having any suitable property or characteristic, depending on the design of the circulator. The rod 120 and the sleeve 130 can be formed by isostatically compressing dielectric material to provide uniform electrical properties throughout the components. Alternatively, the rods 120 can be manufactured using an extrusion process. The rod 120 and the sleeve 130 can have any suitable shape or configuration, such as a cylindrical configuration (e.g., solid for the rod 120 and hollow for the sleeve 130). The rod 120 and the sleeve 130 can be of any suitable size or dimension. The magnetic saturation value and the diameter of the rod and sleeve may be selected based on the central frequency and the designed bandwidth of operation of the circulator. In one aspect, the rod 120 and the sleeve 130 can have length dimensions of 1" or larger. The opening or hole 131 in the sleeve 130 to accommodate the rod 120 (or another sleeve) can be formed by any suitable technique or process, such as drilling, boring, etc. It should be recognized that any number of sleeves having any suitable material property can be disposed about a given rod to achieve, for example, the configuration of the composite substrate circulator component 200 shown in FIG. 2.

In one aspect, the rod 120, the sleeve 130, and/or the block 110 can be bonded to one another. Any suitable adhesive can be used, such as a high temperature adhesive (e.g., Aremco 503 VFG and DuPont QM44, ESL 485) that can have a high temperature coefficient of thermal expansion (CTE) matched to the materials of the rod 120, the sleeve 130 and the block 110 to minimize thermal induced stresses. For example, the rod 120 and the sleeve 130 can be bonded to one another prior to insertion into the hole 111 in the block 110. The bonded rod 120 and sleeve 130 can then be inserted into the hole 111 and bonded to the block 110. In another aspect, the rod 120, the sleeve 130, and/or the block 110 can be press-fitted and/or shrink-fitted to join with one another.

An assembly of rods, sleeves, and block (e.g., the assembly 105 shown in FIG. 3) can be divided to form multiple plates, with each plate having a portion of the rods, sleeves, and block. This is illustrated in FIG. 4, where eight plates 106 have been formed from the assembly 105 of FIG. 3. The assembly can be divided perpendicular to a length direction 108 of the rods 120 and the sleeves 130 such that the rods form disks 102 and the sleeves form rings 103. The block, ring, and sleeve assembly can be divided in any suitable manner utilizing any suitable process or technique. For example, a wire saw can be used to cut or slice the assembly 105. In one aspect, the plates 106 can be divided, such as along lines 107a-c, to form multiple composite substrate circulator components (i.e., multiple composite substrate circulator components 100 as shown in FIG. 1). The dividing lines 107a-c can be of any suitable shape or configuration, such as linear, curved, curvilinear, etc., to achieve a suitable shape for a given circulator design. In the illustrated example, the plate 106 can yield six composite substrate circulator components, with each composite substrate circulator component having a pair of disks and associated rings (i.e., arrayed composite substrates). In another aspect, the rod, sleeve, and block assembly can be configured to yield plates that each form a composite substrate circulator component with no further division of the plates. The size of the block 110 and the length and number of rods 120 and sleeves 130 can be adjusted to provide any number of plates 106 to yield any number of composite substrates. Thus, the components of the block, rod, and sleeve can be configured in any suitable manner to yield multiple composite substrates for any applicable circulator design. The principles disclosed herein can therefore provide the ability to fabricate a high volume of composite circulator substrates in a cost-effective manner.

The composite substrate circulator component 100 can be metallized for use in a circulator. In some cases, the interface between the disk 102, the ring 103, and/or the matrix 101 of the composite substrate circulator component 100 can have small gaps. Such gaps can be sealed by a suitable material (e.g., DuPont QM44, DuPont 8190, DuPont 9615, ESL 485, and Heraeus 9036) in preparation for metallization, which can be sensitive to surface discontinuities. In preparation for gap sealing, some material may be removed proximate a given interface to create a recess or void to receive gap sealant material. Outer surfaces of the composite substrate circulator component 100 can be finished (e.g., planarized and/or polished) to provide a desired surface finish and/or dimension. The gap sealing and subsequent planarization and/or polishing can ensure continuity of the metallization.

Figure 5:
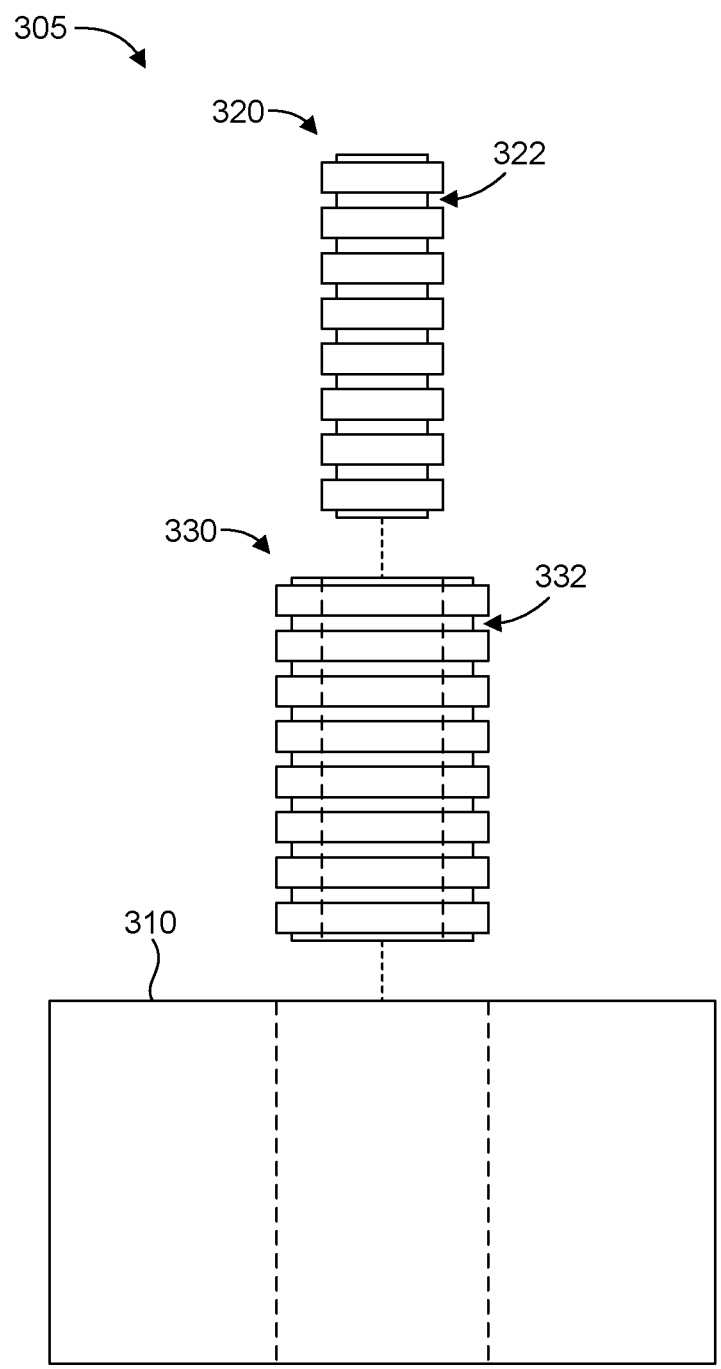
FIG. 5 is an exploded view of a composite substrate circulator component precursor in accordance with another example of the present disclosure.
Figure 6:
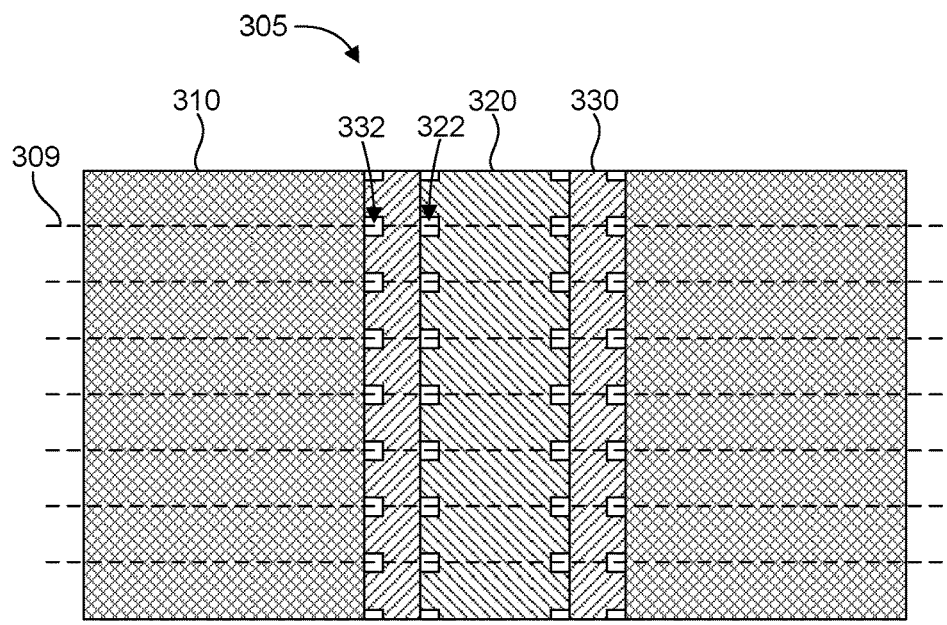
FIG. 6 is a cross-sectional view of the composite substrate circulator component precursor of FIG. 5.
Figure 7:
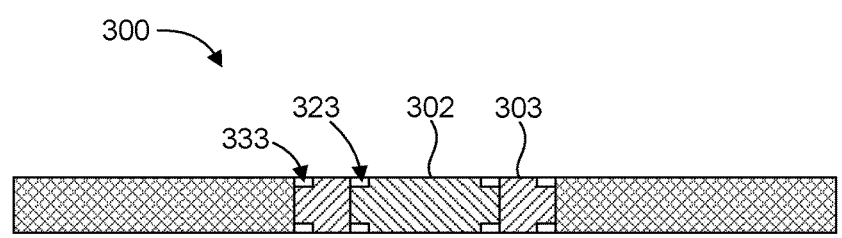
FIG. 7 is an illustration of a composite substrate circulator component in accordance with another example of the present disclosure.
Figure 8:
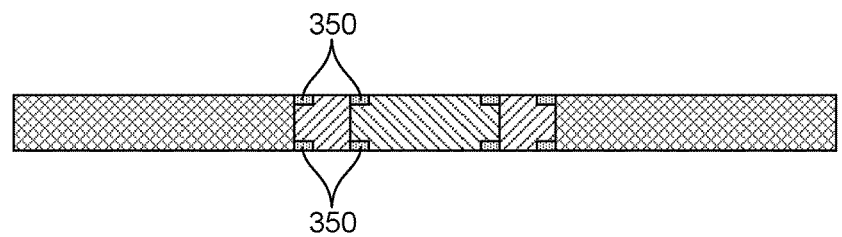
FIG. 8 is an illustration of the composite substrate circulator component of FIG. 7 with gap sealant in accordance with an example of the present disclosure.

Because material is often removed, as mentioned above, to facilitate gap sealing following formation of a composite substrate circulator component, a rod and/or a sleeve can be configured in advance to facilitate gap sealing. For example, as shown in FIG. 5, a rod 320 and/or a sleeve 330 can have longitudinally spaced recesses 322, 332, respectively. Such recesses 322, 332 can extend circumferentially about the rod 320 and/or the sleeve 330 and can be formed by any suitable technique or process, such as turning or grinding machining processes or selective laser drilling. When the rod 320 and the sleeve 330 are assembled with a block 310 (i.e., forming an assembly or a composite substrate circulator component precursor 305) as shown in FIG. 6, the assembly 305 can be divided along lines 309, which can be configured to intersect the recesses 322, 332. Thus, as shown in FIG. 7, a composite substrate 300 can include recesses or voids 323, 333 in a disk 302 and/or a ring 333, respectively, following division of the assembly at the lines 309 (i.e., at the recesses 322, 332). In other words, material can be removed to facilitate gap sealing at the formation stage of the rod 320 and/or sleeve 330. The recesses or voids that will receive gap sealant material are therefore present or integrated into the assembly 305 prior to the division of the assembly along lines 309 and formation of individual plates or components. The recesses or voids 323, 333 exposed by the division of the assembly 305 can be filled with gap sealant 350 as shown in FIG. 8, and finished as desired in preparation for metallization.

It is noted that no specific order is required in the methods disclosed herein, though generally in some embodiments, method steps can be carried out sequentially.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A method for making a composite substrate circulator component, comprising:
   disposing a plurality of sleeves about a plurality of rods, respectively;
   disposing the plurality of rods and the plurality of sleeves in a plurality of openings in a block to form an assembly; and
   dividing the assembly to form a plurality of plates, each of the plurality of plates comprising:
      a portion of the plurality of sleeves to form at least one ring,
      a portion of the plurality of rods to form at least one disk surrounded by the at least one ring, and
      a portion of the block to form a matrix surrounding the at least one disk and the at least one ring, the matrix being a structure of a composite substrate circulator component that is operable in a circulator.

2. The method of claim 1, wherein each of the plurality of plates forms the composite substrate circulator component.

3. The method of claim 1, further comprising dividing the plurality of plates to form a plurality of composite substrate circulator components, wherein each of the composite substrate circulator components comprise a portion of at least one of the plurality of rods and a portion of at least one of the plurality of sleeves.

4. The method of claim 1, further comprising bonding a rod among the plurality of rods and a sleeve among the plurality of sleeves to one another.

5. The method of claim 4, further comprising bonding the plurality of sleeves and the block to one another.

6. The method of claim 1, wherein each of the plurality of rods have a cylindrical configuration.

7. The method of claim 1, wherein disposing the plurality of sleeves about the plurality of rods comprises disposing multiple sleeves among the plurality of sleeves about at least some of the plurality of rods, and wherein a portion of the multiple sleeves in each of the plurality of plates forms multiple rings that surround an associated disk.

8. The method of claim 1, wherein at least one of the plurality of rods or at least one of the plurality of sleeves comprises a magnetic material.

9. The method of claim 8, wherein the magnetic material is selected from at least the group consisting of ferrite, garnet, spinel, and hexaferrite.

10. The method of claim 8, wherein a magnetic saturation value of the rod is different than a magnetic saturation value of the sleeve to radially vary the magnetic saturation values of the rod and the sleeve.

11. The method of claim 8, wherein a magnetic saturation value of the rod is greater than a magnetic saturation value of the sleeve.

12. The method of claim 1, wherein the block comprises a dielectric material.

13. The method of claim 1, wherein the block has a cuboid configuration.

\* \* \* \* \*